(12) United States Patent
Fuwa

(10) Patent No.: US 8,828,116 B2
(45) Date of Patent: Sep. 9, 2014

(54) METAL POWDER FOR SELECTIVE LASER SINTERING, METHOD FOR MANUFACTURING THREE-DIMENSIONAL SHAPED OBJECT BY USING THE SAME, AND THREE-DIMENSIONAL SHAPED OBJECT OBTAINED THEREFROM

(75) Inventor: Isao Fuwa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/696,382

(22) PCT Filed: May 23, 2011

(86) PCT No.: PCT/JP2011/062309
§ 371 (c)(1),
(2), (4) Date: Nov. 6, 2012

(87) PCT Pub. No.: WO2011/149101
PCT Pub. Date: Dec. 1, 2011

(65) Prior Publication Data
US 2013/0065073 A1 Mar. 14, 2013

(30) Foreign Application Priority Data
May 25, 2010 (JP) .................. 2010-119297

(51) Int. Cl.
| | | |
|---|---|---|
| *C22C 1/05* | (2006.01) | |
| *C22C 1/04* | (2006.01) | |
| *C22C 33/02* | (2006.01) | |
| *C22C 38/08* | (2006.01) | |
| *B22F 7/00* | (2006.01) | |
| *C22C 38/12* | (2006.01) | |
| *B22F 1/00* | (2006.01) | |
| *B32B 5/30* | (2006.01) | |
| *C22C 38/14* | (2006.01) | |
| *C22C 38/06* | (2006.01) | |
| *B22F 3/105* | (2006.01) | |
| *C22C 38/10* | (2006.01) | |

(52) U.S. Cl.
CPC .............. *B22F 1/0003* (2013.01); *C22C 38/12* (2013.01); *B32B 5/30* (2013.01); *C22C 38/14* (2013.01); *C22C 38/06* (2013.01); *C22C 33/0207* (2013.01); *C22C 33/0285* (2013.01); *B22F 3/1055* (2013.01); *C22C 38/105* (2013.01)
USPC ........ 75/255; 75/252; 419/6; 419/23; 419/29; 419/46; 420/95; 420/96; 428/546; 428/681; 428/457; 428/697

(58) Field of Classification Search
None
See application file for complete search history.

(56) References Cited

U.S. PATENT DOCUMENTS 4,098,607 A * 7/1978 Rizzitano et al. ................ 75/243
4,194,900 A * 3/1980 Ide et al. .......................... 75/255

(Continued)

FOREIGN PATENT DOCUMENTS

| EP | 2 060 343 A1 | 5/2009 | |
|---|---|---|---|
| GB | 1174776 | * 11/1966 | .............. C22C 33/02 |

(Continued)

OTHER PUBLICATIONS

International Search Report for corresponding International Application No. PCT/JP2011/062309 mailed Aug. 30, 2011.

(Continued)

*Primary Examiner* — Gwendolyn Blackwell
*Assistant Examiner* — Seth Dumbris
(74) *Attorney, Agent, or Firm* — Renner, Otto, Boisselle & Sklar, LLP

(57) ABSTRACT

There is provided a metal powder for use in a selective laser sintering method for producing a three-dimensional shaped object, wherein the metal powder comprises a powder mixture of a precipitation-hardening metal composition. In particular, the metal powder of the present invention is configured to have a Fe-based component powder and a Ni-based component powder which are individually included in the powder mixture wherein a powder made of an alloy of Fe-based and Ni-based components is not included as a main powder in the powder mixture.

3 Claims, 9 Drawing Sheets

(56) References Cited

U.S. PATENT DOCUMENTS

| | | | |
|---|---|---|---|
| 4,618,473 A * | 10/1986 | Jandeska, Jr. | 419/11 |
| 4,678,510 A * | 7/1987 | Jandeska et al. | 75/244 |
| 4,863,538 A | 9/1989 | Deckard | |
| 4,938,816 A | 7/1990 | Beaman et al. | |
| 4,944,817 A | 7/1990 | Bourell et al. | |
| 5,017,753 A | 5/1991 | Deckard | |
| 5,053,090 A | 10/1991 | Beaman et al. | |
| 5,076,869 A | 12/1991 | Bourell et al. | |
| 5,132,143 A | 7/1992 | Deckard | |
| 5,147,587 A | 9/1992 | Marcus et al. | |
| 5,155,324 A | 10/1992 | Deckard et al. | |
| 5,156,697 A | 10/1992 | Bourell et al. | |
| 5,182,170 A | 1/1993 | Marcus et al. | |
| 5,284,695 A | 2/1994 | Barlow et al. | |
| 5,296,062 A | 3/1994 | Bourell et al. | |
| 5,316,580 A | 5/1994 | Deckard | |
| 5,382,308 A | 1/1995 | Bourell et al. | |
| 5,431,967 A | 7/1995 | Manthiram et al. | |
| 5,597,589 A | 1/1997 | Deckard | |
| 5,616,294 A | 4/1997 | Deckard | |
| 5,639,070 A | 6/1997 | Deckard | |
| 8,329,092 B2 * | 12/2012 | Fuwa et al. | 75/252 |
| 8,361,254 B2 * | 1/2013 | Bailey et al. | 148/529 |
| 2006/0285989 A1 * | 12/2006 | Schade | 419/11 |
| 2007/0053784 A1 * | 3/2007 | Muha et al. | 419/29 |
| 2007/0111023 A1 * | 5/2007 | Bailey et al. | 428/683 |
| 2009/0047165 A1 * | 2/2009 | Syvanen et al. | 420/61 |
| 2011/0123383 A1 | 5/2011 | Fuwa et al. | |

FOREIGN PATENT DOCUMENTS

| | | | | |
|---|---|---|---|---|
| JP | 61-030602 A | | 2/1986 | |
| JP | 01-502890 A | | 10/1989 | |
| JP | 06-330107 A | | 11/1994 | |
| JP | 2000-073108 A | | 3/2000 | |
| JP | 2000-273503 A | | 10/2000 | |
| JP | 2008-081840 A | | 4/2008 | |
| JP | EP 2060343 | * | 5/2009 | B22F 1/00 |
| SE | WO 02/092264 | * | 11/2002 | B22F 1/05 |
| WO | 88/02677 A | | 4/1988 | |

OTHER PUBLICATIONS

Form PCT/ISA/237 for corresponding International Application No. PCT/JP2011/062309 mailed Aug. 30, 2011.

Miura et al., "Fabrication of Maraging Steels by Metal Injection Molding Process", described in "Powder and Powder Metallurgy", vol. 42 (1995) pp. 353-356 and partial English translation.

International Preliminary Report on Patentability for corresponding International Application No. PCT/JP2011/062309 mailed Aug. 30, 2011 and English translation.

* cited by examiner

Fig. 1
(a)
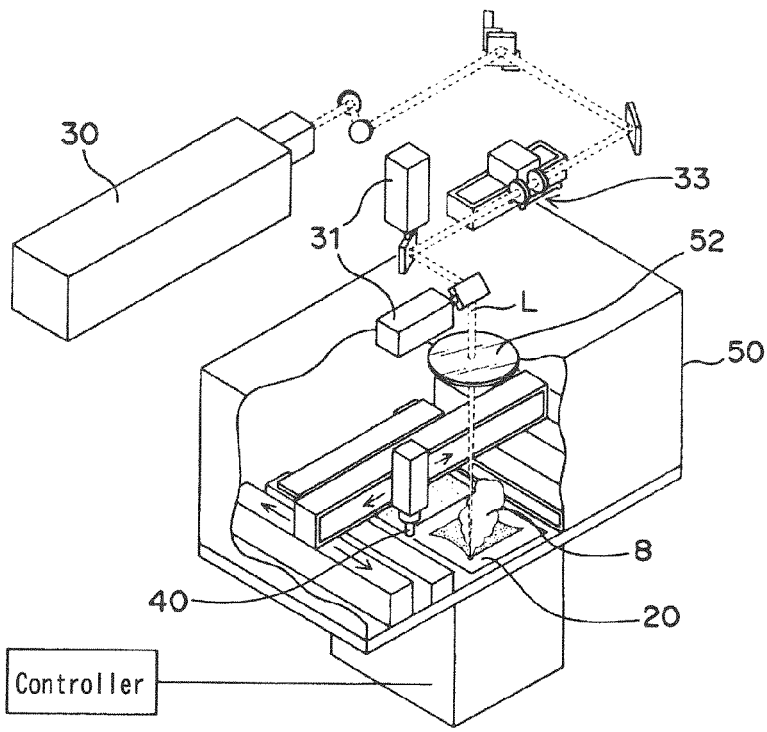
(b)
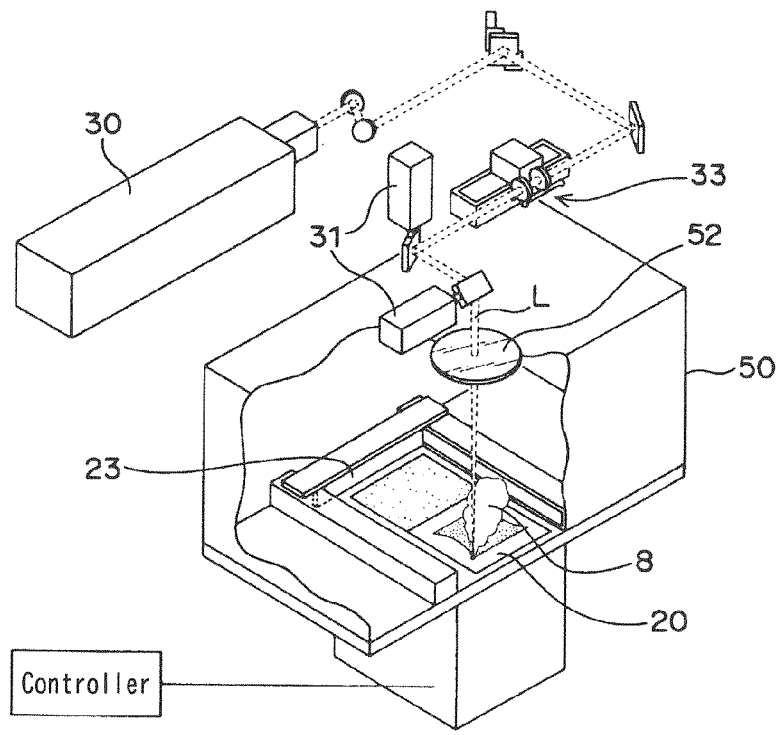

Fig. 2
(a)
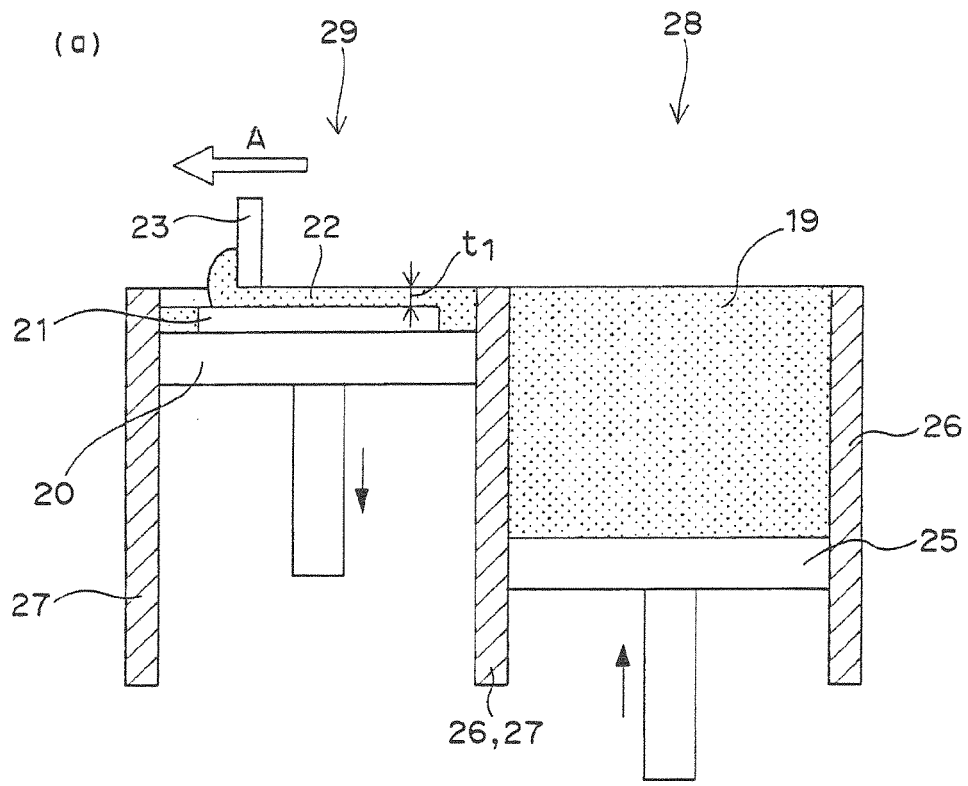
(b)
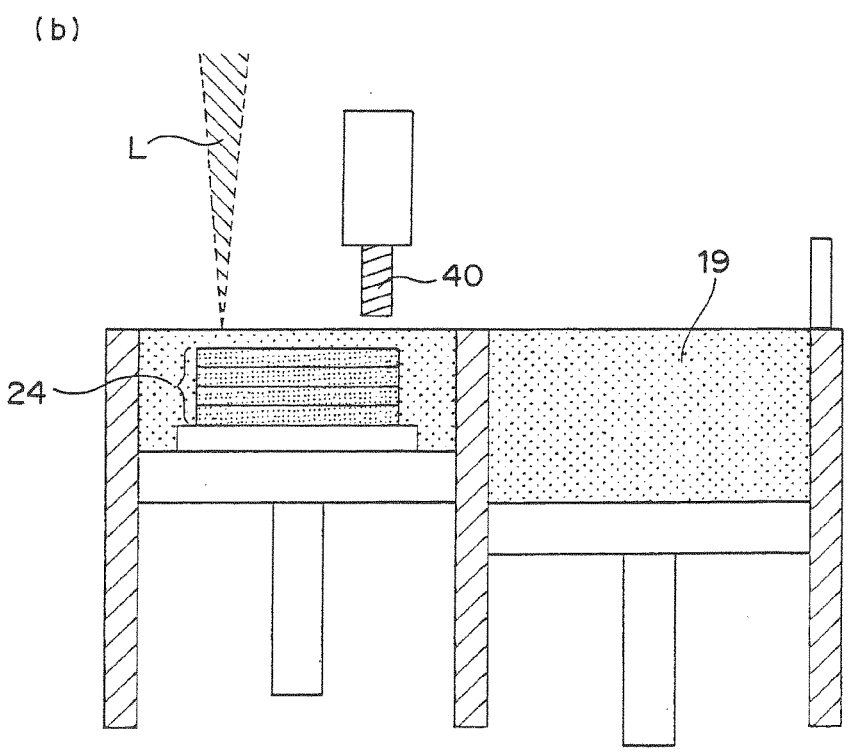

Fig. 7

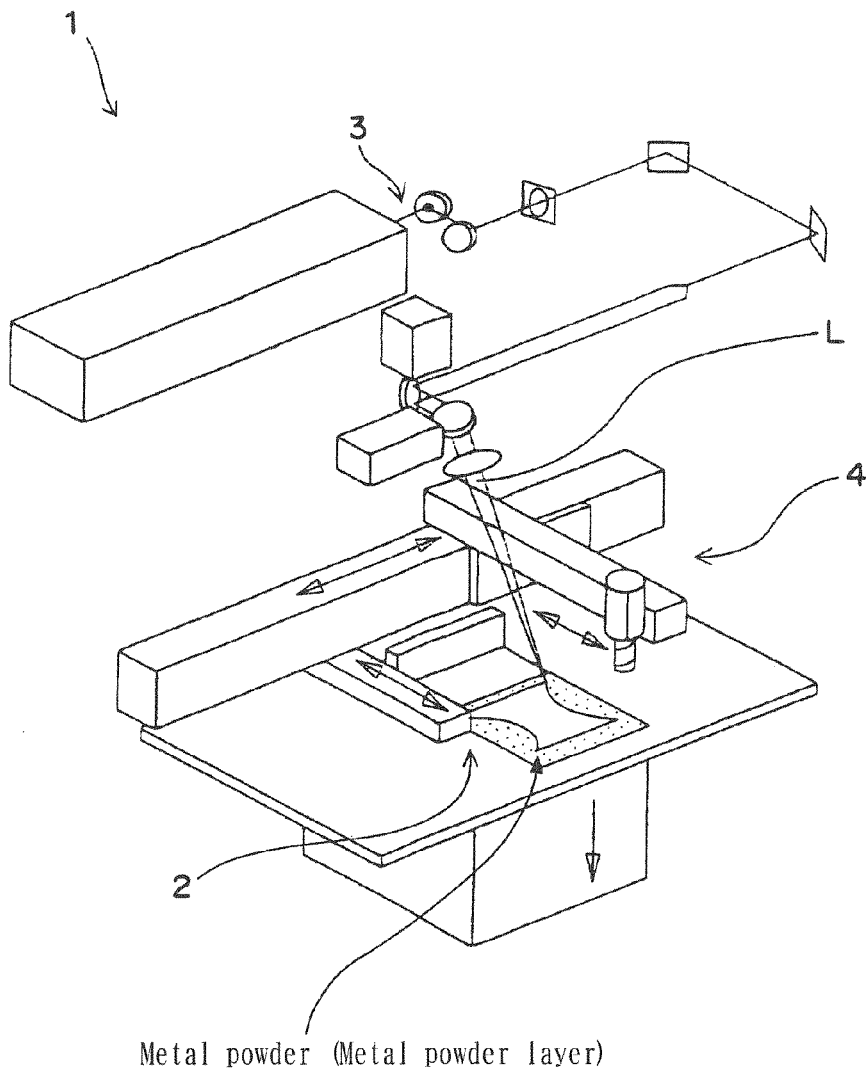

Metal powder (Metal powder layer)

Mixture powder of precipitation-hardening type metal composition

- Fe-based component powder and Ni-based component powder both of which are individually contained wherein Fe-based component and Ni-based component does not form an alloy with each other.

- Ni-based component powder in which Ni-based component is an individual one to be not alloyed.

Fig. 8
(a) Use of 18 Ni-based maraging
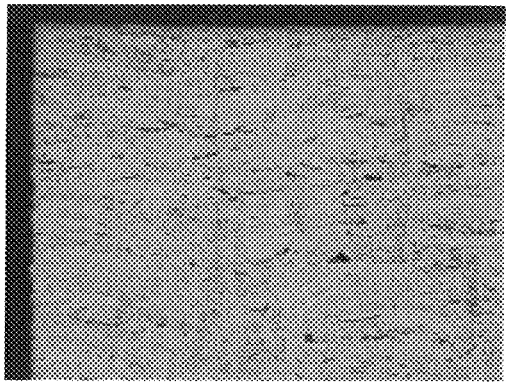
0.1 mm
(b) Use of 20 Ni-based maraging
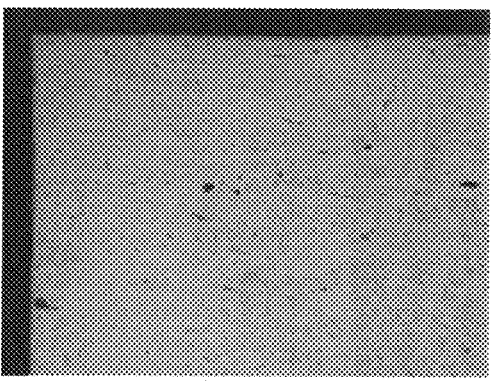
(c) Use of Precipitation-hardening stainless (SUS630)
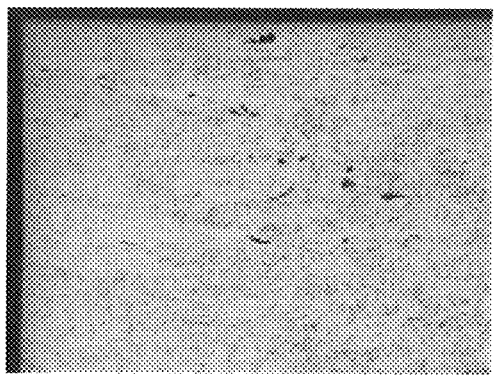

Fig. 9
(a) Fe powder
(b) Ni powder
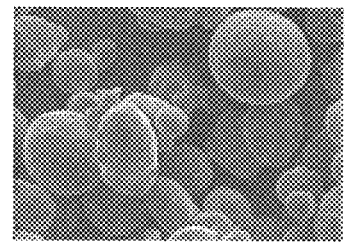
(c) Co-based powder
(d) Mo-based powder
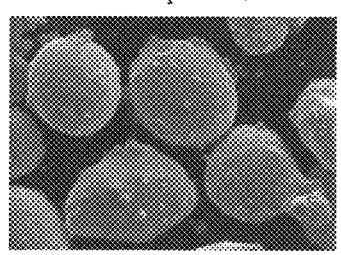
(e) Ti powder
(f) Al powder
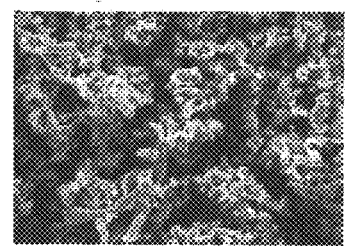
10μm

METAL POWDER FOR SELECTIVE LASER SINTERING, METHOD FOR MANUFACTURING THREE-DIMENSIONAL SHAPED OBJECT BY USING THE SAME, AND THREE-DIMENSIONAL SHAPED OBJECT OBTAINED THEREFROM

TECHNICAL FIELD

The present invention relates to a metal powder for use in a selective laser sintering method, and also relates to a method for manufacturing three-dimensional shaped object by using such metal powder, and further relates to a three-dimensional shaped object obtained therefrom. More particularly, the present invention relates to a metal powder for use in a metal laser-sintering wherein a three-dimensional shaped object is produced through a powder sintering caused by a light beam irradiation, and also relates to a method for manufacturing three-dimensional shaped object by using such metal powder. Furthermore, the present invention relates to a three-dimensional shaped object obtained from such manufacturing method.

BACKGROUND OF THE INVENTION

Heretofore, a method for manufacturing a three-dimensional shaped object by irradiating a powder with a light beam has been known (such method can be generally referred to as selective laser sintering method or metal laser-sintering). Such method can produce a three-dimensional shaped object with a plurality of solidified layers stacked integrally by repeating the step (i) of forming a solidified layer by irradiating a predetermined portion of a powder layer with a light beam, thereby allowing sintering of the predetermined portion of the powder or melting and subsequent solidification thereof, and the step (ii) of forming another solidified layer by newly forming a powder layer on the resulting solidified layer, followed by similarly irradiating the powder layer with the light beam (see JP-T-01-502890 or JP-A-2000-73108). The three-dimensional shaped object thus obtained can be used as a metal mold in a case where a metal powder is used as the powder material. While on the other hand, the three-dimensional shaped object can be used as a plastic replica in a case where a resin powder is used as the powder material. This kind of technology makes it possible to produce the three-dimensional shaped object with a complicated contour shape in a short period of time. Particularly when a sufficient melting of the metal powder occurs by the irradiation of the light beam with high energy density, a sintered density of almost 100% can be achieved after the solidification of the melted metal powder. The resulting shaped object with such high density can be subsequently subject to a finish machining treatment for smoothing a surface thereof. The shaped object thus finally obtained can be used as a metal mold for plastic molding.

In this regard, however, the metal powder used as a raw material for such selective laser-sintering is required to have different characteristics from those of another kind of powder-sintering process in which a powder compacting followed by a sintering of the compacted powder is performed.

For example, it is required for the metal powder to have a particle diameter smaller than the thickness of the powder layer to be irradiated with the light beam. Such smaller particle diameter provides a higher packing density of the powder as well as an improved absorption efficiency of the light beam upon producing the shaped object. This will lead to a higher sintered density and a smaller surface-roughness of the shaped object. On the other hand, when the particle diameter is too small, the metal powder tends to form the aggregated particles so that a packing density of the powder becomes lower, thus making it impossible to uniformly form a thin metal layer thereof.

In order to increase the strength of the shaped object, it is required that a contact area is large and a bonding strength is high between a newly formed sintered layer and a preceding and solidified sintered layer lying thereunder. In this case, even between the newly formed sintered layer and an adjacent solidified sintered layer, there is required a large contact area and a high bonding strength.

Furthermore, it is required in the selective laser sintering method that a top surface of the newly formed sintered layer does not have a significant bulge. The bulge with more than the thickness of the powder layer can interfere with the spreading of the subsequent powder layer, making it impossible to suitably form such subsequent powder layer.

Upon irradiating the metal powder with the light beam, the metal powder is allowed to melt partially or wholly. The melted metal powder is then solidified through a subsequent rapid cooling thereof. This results in a formation of a sintered material. When the melted metal powder has a high wettability, the contact area between the melted metal powder and the adjacent sintered layer becomes larger, in which case a less bulge is formed if the melted metal powder has a higher fluidity. Therefore, it is desired that the metal powder, when melted, has not only a high wettability but also a high fluidity.

DISCLOSURE OF THE INVENTION

The inventors of the present application have been studying and developing various kinds of mixture powders which can be used in the selective laser sintering method. For example, one of the developed powder by the inventors is a mixture powder composed of a chromium-molybdenum steel powder, a nickel powder and/or a nickel based alloy powder, a copper powder and/or a copper based alloy powder and a graphite powder. The chromium-molybdenum steel is used for the reason of strength and toughness. The copper and copper-based alloy powders are used for the reason of wettability and fluidity. The nickel and nickel-based alloy powders are used for the reason of strength and machinability. The graphite powder is used for the reason of an absorbing rate of the light beam and a reduction in micro cracks. However, such mixture powder cannot bring about a sufficient hardness in the sintered product. Namely, the shaped object obtained by the selective laser sintering method using the above mixture powder tends to exhibit a Vickers hardness of 260 at most for example, and thus it does not have a sufficiently high hardness. This can lead to a concern in terms of a durability of the shaped object especially in a case where the shaped object is used for a metal mold for a plastic injection molding to produce a glass fiber-contained plastic molded part.

As for the metal powder material, there is a study on a sintering of a maraging steel powder, for example. See "Fabrication of Maraging Steels by Metal Injection Molding Process" described in "Powder and Powder metallurgy" (volume 42 (1995), page 353-356). The maraging steel is, for example, an ultrahigh-strength steel with a high Ni content (16% to 18%) and an extremely low content (less than 0.03%) of carbon, developed by International Nickel Co. Ltd (Canada) in 1960. This steel was named based on "Martensite" and "Aging" in light of the fact that a high mechanical strength is achieved by generating a martensite structure, followed by an aging treatment. The metal powder of the maraging steel has no particular problem when a high-density solidified layer is formed wherein all of the alloy powder of the maraging composition are allowed to melt by a light beam irradiation having a high energy density. However, it is hard to form a low-density solidified layer by a light beam irradiation having a low energy density wherein a part of the powder of the maraging steel composition is sintered by such low energy-density beam. One reason for this is assumed that the maraging composition contains a large amount of nickel. The content of nickel can bring about a high hardness and a high mechanical strength, while on the other hand such nickel content can inhibit a low-density sintering which is featured by the selective laser sintering method. No low-density sintering leads to no provision of a gas venting effect attributed to the low-density sintering. Also, the inhibiting of the low-density sintering leads to an excessive electric powder for the light beam irradiation, which leads to an increase in a manufacturing cost of the shaped object. Further, the inhibiting of the low-density sintering makes it impossible to increase a scanning rate of the beam, and thereby a manufacturing efficiency of the shaped object can be lowered. In this regard, even in the case when the high-density solidified layer is formed by allowing all of the alloy powder of the maraging composition to melt by the light beam irradiation having the high energy density, there may be another concern of a warping or deformation of the shaped object due to a thermal stress.

Under the above circumstances, the present invention has been created. Thus, an object of the present invention is to provide a means for suitably using a maraging steel as a raw material powder in the selective laser sintering method.

In order to achieve the above object, the present invention provides a metal powder as the raw material for use in a selective laser sintering method for producing a three-dimensional shaped object, wherein the metal powder comprises a powder mixture of a precipitation-hardening metal composition; and a Fe-based component powder and a Ni-based component powder are individually included in the powder mixture whereas a powder made of an alloy of Fe-based and Ni-based components is not included as a main powder in the powder mixture.

One of features of the present invention is that the metal powder for use in the selective laser sintering method (so-called "metal-laser sintering"), which is to be sintered by the laser beam, comprises a powder mixture of a precipitation-hardening metal composition wherein a Fe-based component powder and a Ni-based component powder are respectively included as individual powder in the powder mixture. By using such metal powder, a low-energy sintering can be achieved in the selective laser sintering method in spite of the matter that the mixture powder of the metal powder contains a powder composition of a precipitation-hardening metal such as a maraging steel. The use of the metal powder of precipitation-hardening metal composition leads to an achievement of high hardness and high mechanical strength in the shaped object.

The phrase powder mixture of a precipitation-hardening metal composition as used in the present description means a powder mixture is composed of metal component powders which constitute a precipitation-hardening metal composition. Unless otherwise specifically described, any ones of the metal components of the precipitation-hardening metal composition may be contained in a powder particle such that they are combined with each other, or at least one of the metal components of the precipitation-hardening metal composition may be individually contained in a powder particle.

The phrase a powder made of an alloy of Fe-based and Ni-based components is not included as a main powder as used in the present description is essentially intended not to include a powder made of an alloy of Fe-based and Ni-based components in the mixture powder, and however it substantially means that a slight amount of the powder made of an alloy of Fe-based and Ni-based components may be included (as a second powder component). Specifically, the powder made of an alloy of Fe-based and Ni-based components may be contained in the mixture powder if the content thereof is as low as about 1 weight percent or lower, based on the total weight of the metal powder.

In one preferred embodiment, the Ni-based component powder is a powder made of an individual component such that the Ni-based component is not alloyed with any other component of the precipitation-hardening metal composition, or not alloyed with the impurity components. In other words, the powder mixture of the metal powder according to the present invention contains no powder particle of nickel alloy.

The precipitation-hardening metal composition may be a maraging steel composition or a precipitation-hardening stainless steel composition. In other words, the metal powder of the present invention may comprise the powder mixture of a maraging steel composition or a precipitation-hardening stainless steel composition.

In a case of the powder mixture of the maraging steel composition, such maraging steel composition comprises 17 to 19 weight percent of Ni component (i.e., nickel component), 7 to 8.5 weight percent of Co component (i.e., cobalt component), 4.6 to 5.1 weight percent of Mo component (i.e., molybdenum component), 0.3 to 0.5 weight percent of Ti component (i.e., titanium component), 0.05 to 0.15 weight percent of Al component (i.e., aluminum component) and a remaining weight percent of Fe component (i.e., iron component).

It is preferred that powder particles of the powder mixture have an average diameter of 5 μm to 50 μm. It is also preferred that the powder particle of the powder mixture has a spherical form or an approximately spherical form. This means that the powder particles of the powder mixture preferably have an aspect ratio of 1.0 to 2.0. Such aspect ratio of the powder particles is more preferably in the range of 1.0 to 1.5, and most preferably in the range of 1.0 to 1.2. The term aspect ratio used herein means a ratio of maximum length dimension to minimum length dimension (=maximum length/minimum length) wherein the dimensions of the powder particle are measured in various different directions.

The present invention also provides a method for manufacturing a three-dimensional shaped object which is performed by the use of the aforementioned metal powder. The method of the present invention is a selective laser sintering method comprising the steps of:

(i) forming a solidified layer by irradiating a predetermined portion of a powder layer made of the aforementioned metal powder with a light beam, thereby allowing sintering of the powder of the predetermined portion or melting and subsequent solidification thereof; and (ii) forming another solidified layer by newly forming a powder layer on the resulting solidified layer, and then irradiating another predetermined portion of the new powder layer with the light beam, the steps (i) and (ii) being repeatedly performed.

As used in this description, the term powder layer substantially means metal powder layer made of a metal powder. Also, the term predetermined portion of a powder layer substantially means a portion of a three-dimensional shaped object to be manufactured. Therefore, a powder existing in such predetermined portion is irradiated with a light beam (laser), whereby, the powder undergoes a sintering or a melting and subsequent solidification thereof to form a shape of the three-dimensional shaped object. Furthermore, with respect to the metal powder layer, solidified layer generally corresponds to sintered layer, and solidified density can correspond to sintered density.

The manufacturing method of the present invention can form the sintered layer by a lower irradiation energy than that required in a conventional powder of maraging steel (e.g., a maraging steel composition powder mixture which contains powder made of an alloy of Fe-based and Ni-based components and/or powder made of an alloy of Ni-based component and any other component of the precipitation-hardening metal composition). Namely, the present invention makes it possible to reduce an output energy of the light beam irradiated onto the powder layer. For example, the three-dimensional shaped object can be obtained by performing the irradiation of the light beam under such a condition that an irradiation energy density E of the light beam is in the range of 0.5 J/mm² to 7.0 J/mm² (wherein an energy density E: E=laser output [W]/(scanning rate [mm/s])×(scanning pitch [mm])) in a case of the following manufacturing conditions.

Manufacturing Condition
Powder layer thickness: 0.05 mm
Laser: CO₂ laser (Carbon dioxide laser)
Spot diameter: 0.5 mm In one preferred embodiment, the obtained three-dimensional shaped object is subjected to a precipitation-hardening treatment. In this case, the three-dimensional shaped object may be subjected to a heat treatment under a temperature condition of 400° C. to 550° C. In this regard, three-dimensional shaped object produced by a solidified layer formation/machining process, i.e., three-dimensional shaped object obtained after the completion of the laser-sintering/machining hybrid operation may be subjected to the heat treatment, for example.

In another preferred embodiment, the three-dimensional shaped object may be subjected to a nitriding treatment as a surface effect treatment. This nitriding treatment can be performed upon the above precipitation-hardening treatment. In other words, the nitriding treatment with respect to the surface of the three-dimensional shaped object may be performed when the three-dimensional shaped object is subjected to the heat treatment at the temperature of 400° C. to 550° C.

In yet another preferred embodiment, the formations of the powder layer and the solidified layer can be performed on a base plate. In this case, it is preferable to perform a pretreatment for reducing a "dimension change attributed to the above heat treatment". For example, prior to the formations of the powder layer and the solidified layer on the base plate, the base plate may be heated at a higher temperature than the temperature of the above precipitation-hardening treatment, and thus may be heated at a temperature higher than 400° C. to 550° C. The term base plate as used in the present description substantially means a member which serves as a platform for the three-dimensional shaped object to be manufactured. In a preferred embodiment, the term base plate means a plate-like member disposed on a forming table (refer also to an explanation described hereinafter).

The present invention also provides a three-dimensional shaped object obtained by the aforementioned manufacturing method. The three-dimensional shaped object of the present invention has a relatively higher hardness due to the use of the above metal powder in the selective laser sintering method. In this regard, the three-dimensional shaped object has a Vickers hardness Hv of about 270 to about 350. Especially after the three-dimensional shaped object is subjected to the precipitation-hardening treatment, the shaped object becomes to have a further higher hardness, i.e., a Vickers hardness Hv of 400 to 600. Due to such high harness, the three-dimensional shaped object can be not only suitably used for a metal mold for a resin molding, but also suitably used for a part of the metal mold (e.g., insert part or nest part of the metal mold).

EFFECT OF THE INVENTION

In accordance with the present invention, a Fe-based component powder and a Ni-based component powder are individually included in the powder mixture, and thereby a low-energy sintering can be achieved even if the metal powder contains the powder components of the precipitation-hardening metal composition. In other words, the formation of the solidified layer by a lower energy condition of the light beam can be performed, meaning that the manufacturing of the three-dimensional shaped object can be performed under such lower energy condition. This leads to not only a reduction in a manufacturing cost due to an energy saving of the manufacturing process, but also a short-time manufacturing of the shaped object. Further, the low-energy sintering makes it possible to form a low-density porous portion in the solidified layer, in which case the low-density porous portion can be utilized as a gas venting portion when the three-dimensional shaped object is used as a metal mold. Furthermore, the low-energy sintering allows a thermal loading and a thermal stress to be lowered, which makes it possible to effectively reduce a warping or deformation of the shaped object and the based plate serving as a supporter of the shaped object.

The three-dimensional shaped object manufactured by the selective laser sintering method using the metal powder of the present invention can exhibit a higher hardness and a higher mechanical strength, compared with a metal powder of the prior art (for example, the prior art powder mixture composed of chromium-molybdenum steel powder, a nickel powder and/or a nickel based alloy powder, a copper powder and/or a copper based alloy powder and a graphite powder). Particularly as for the higher hardness, the shaped object has a Vickers hardness Hv of 270 to 350. This hardness can be increased when the shaped object is subjected to a low-temperature precipitation-hardening treatment (e.g., 400° C. to 550° C. heat treatment), and thereby the shaped object becomes to exhibit a higher hardness of a Vickers hardness Hv of 400 to 600. In this regard, as for a conventional maraging steel, it is a common practice to carry out a solution treatment at as high temperature as 800° C. to 1000° C. If such solution treatment is not carried out, a desired hardness and mechanical strength of the shaped object cannot be provided irrespective whether an additional heat treatment (e.g., an additional precipitation-hardening treatment) is carried out or not in the case of the conventional maraging steel. This solution treatment is a high-temperature treatment, and thus it can cause a larger change in dimension of the shaped object when such treatment is directly applied to the selective laser sintering method. That is, even if the three-dimensional shaped object can be manufactured with high dimensional accuracy by performing the laser-sintering/machining hybrid operation, the high-temperature of the solution treatment can cause the dimensional accuracy of the shape object to be diminished. In contrast, according to the metal laser-sintering using the metal powder of the present invention, it is assumed that the shaped object has been substantially pretreated by the solution treatment due to a melting and subsequent rapid cooling upon the manufacturing thereof, which makes it possible to provide a desired hardness and mechanical strength of the shaped object just by subjecting the shaped object to a low-temperature precipitation-hardening treatment (e.g., 400° C. to 550° C. heat treatment). Moreover, the low temperature of such treatment can lead to a lower change in dimension of the shaped object, meaning that the high machining accuracy provided by the laser-sintering/machining hybrid operation can be suitably maintained.

The above advantageous effect becomes pronounced when the Ni-based component powder, which is contained in the powder mixture of the metal powder of the present invention, is a powder made of an individual component. In other words, when the Ni-based component powder is a powder made of an individual metal component such that the Ni-based component is not alloyed with any other component of the precipitation-hardening metal composition, and also is not alloyed with the impurity components, "low-energy sintering (i.e., low-density sintering)" and also "high hardness and high mechanical strength" can be easily achieved. In this regard, the conventional maraging steel cannot achieve the low-density sintering due to the content of the nickel component, but the present invention however can achieve such low-density sintering in spite of the content of the nickel component. While not wishing to be bound by any theory, a containing of a nickel-alloyed component powder in a iron-based powder material can inhibit an integral fusion of the iron-based powder particles by a strong oxide film formed on the surface of the powder particle, making it hard to produce the shaped object with an irradiation of a low energy light beam. On the other hand, the Ni-based component powder of an individual component according to the present invention cannot generate the above inhibiting phenomenon, and thereby the low-energy sintering as well as the high hardness and high mechanical strength can be easily achieved.

BRIEF DESCRIPTION OF THE DRAWING

FIGS. 1(a) and 1(b) are perspective views schematically illustrating a device for performing a metal laser sintering wherein FIG. 1(a) especially shows a hybrid device with a machining mechanism, and FIG. 1(b) especially shows a device without a machining mechanism.

FIGS. 2(a) and 2(b) are sectional views schematically showing operations of a laser-sintering/machining hybrid machine.

FIG. 7 is a schematic view showing a general concept of the present invention.

FIGS. 8(a) to 8(c) are images on appearances of the sectional structures of the stacked-layers shaped objects obtained in Example.

FIGS. 9(a) to 9(f) are images on six different kinds of powder materials used in Example.

Figure 3:
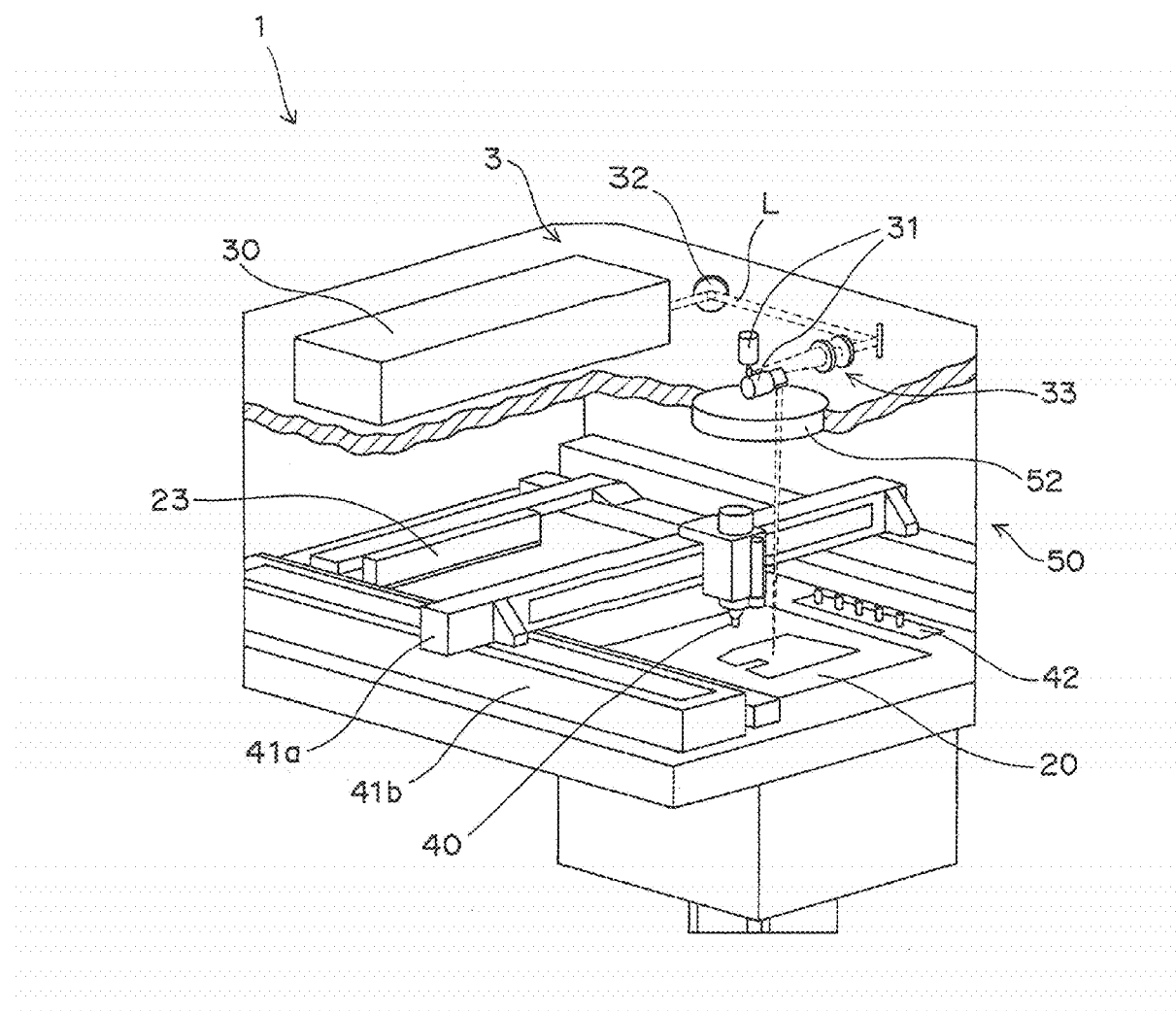
FIG. 3 is a perspective view schematically showing an embodiment in which a selective laser sintering method is carried out.

In the drawings, reference numerals correspond to the following elements:
1 Laser-sintering/machining hybrid machine
2 Powder layer forming means
3 Light-beam irradiation means
4 Machining means
8 Fume
19 Powder/powder layer (e.g., metal powder/metal powder layer)
20 Supporting table
21 Base plate (base plate for shaped object)
22 Powder layer (e.g., metal powder layer)
23 Squeegee blade
24 Solidified layer (e.g., sintered layer)
25 Powder table
26 Wall of storage tank for powder material
27 Wall of forming tank
28 Storage tank for powder material
29 Forming tank
30 Light beam generator
31 Galvanometer mirror
40 Milling head
41 X-Y actuator
50 Chamber
52 Window or lens for transmission of light
L Light beam

BEST MODES FOR CARRYING OUT THE INVENTION

Figure 4:
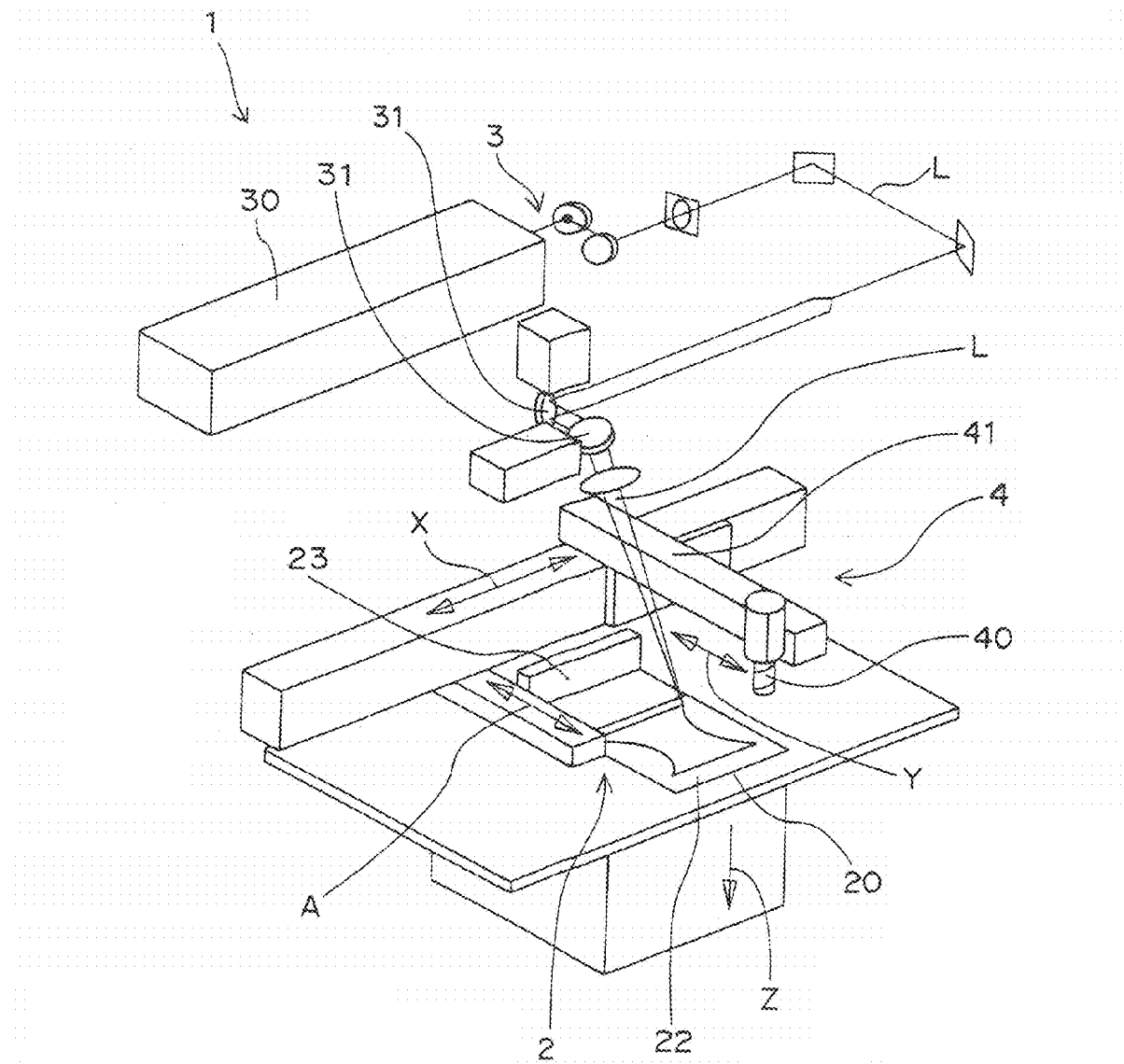
FIG. 4 is a perspective view schematically showing a constitution of a laser-sintering/machining hybrid machine by which a selective laser sintering method is carried out.

The present invention will be hereinafter described in more detail with reference to the accompanying drawings.
[Selective Laser Sintering Method]
First, a selective laser sintering method, on which the manufacturing method of the present invention is based, will be described. For convenience, the selective laser sintering method, which will be described, is one where the powder material is supplied from a storage tank therefor, followed by being flattened by means of a squeegee blade to form a powder layer therefrom. Moreover, by way of example, the selective laser sintering method wherein a machining process is additionally carried out with respect to the shaped object (i.e., the process embodiment shown in FIG. 1(a), not FIG. 1(b)) will be described. FIGS. 2 to 4 show functions and constitutions of a laser-sintering/machining hybrid machine, enabling execution of the selective laser sintering method. The laser-sintering/milling hybrid machine 1 is mainly provided with a powder layer forming means 2 for forming a powder layer by providing a metal powder in a predetermined thickness; a forming table 20 which is capable of vertically elevating/descending in a forming tank 29 whose outer periphery is surrounded with a wall 27; a base plate 21 which is disposed on the forming table 20 and serves as a platform of the shaped object; a light-beam irradiation means 3 for irradiating a desired position with an emitted light beam L; and a machining means 4 for milling the periphery of the shaped object. As shown in FIG. 2, the powder layer forming means 2 is mainly composed of a powder table 25 capable of vertically elevating/descending in a storage tank for powder material 28 whose outer periphery is surrounded with a wall 26 and a squeegee blade 23 for forming a powder layer 22 on the base plate. As shown in FIG. 3 and FIG. 4, the light-beam irradiation means 3 is mainly composed of a light beam generator 30 for emitting a light beam L and a galvanometer mirror 31 (scan optical system) for scanning the light beam L onto a powder layer 22. Optionally, the light-beam irradiation means 3 is equipped with a beam shape correcting means for adjusting a shape of a light beam spot (e.g., a means composed of a pair of cylindrical lens and a rotation drive mechanism for rotating the lens around a shaft line of the light beam) and fθ lens. The machining means 4 is mainly composed of a milling head 40 for milling the periphery of the shaped object and a X-Y actuator 41 (41a, 41b) for driving the milling head 40 to move toward the position to be milled (see FIG. 3 and FIG. 4).

Figure 5:
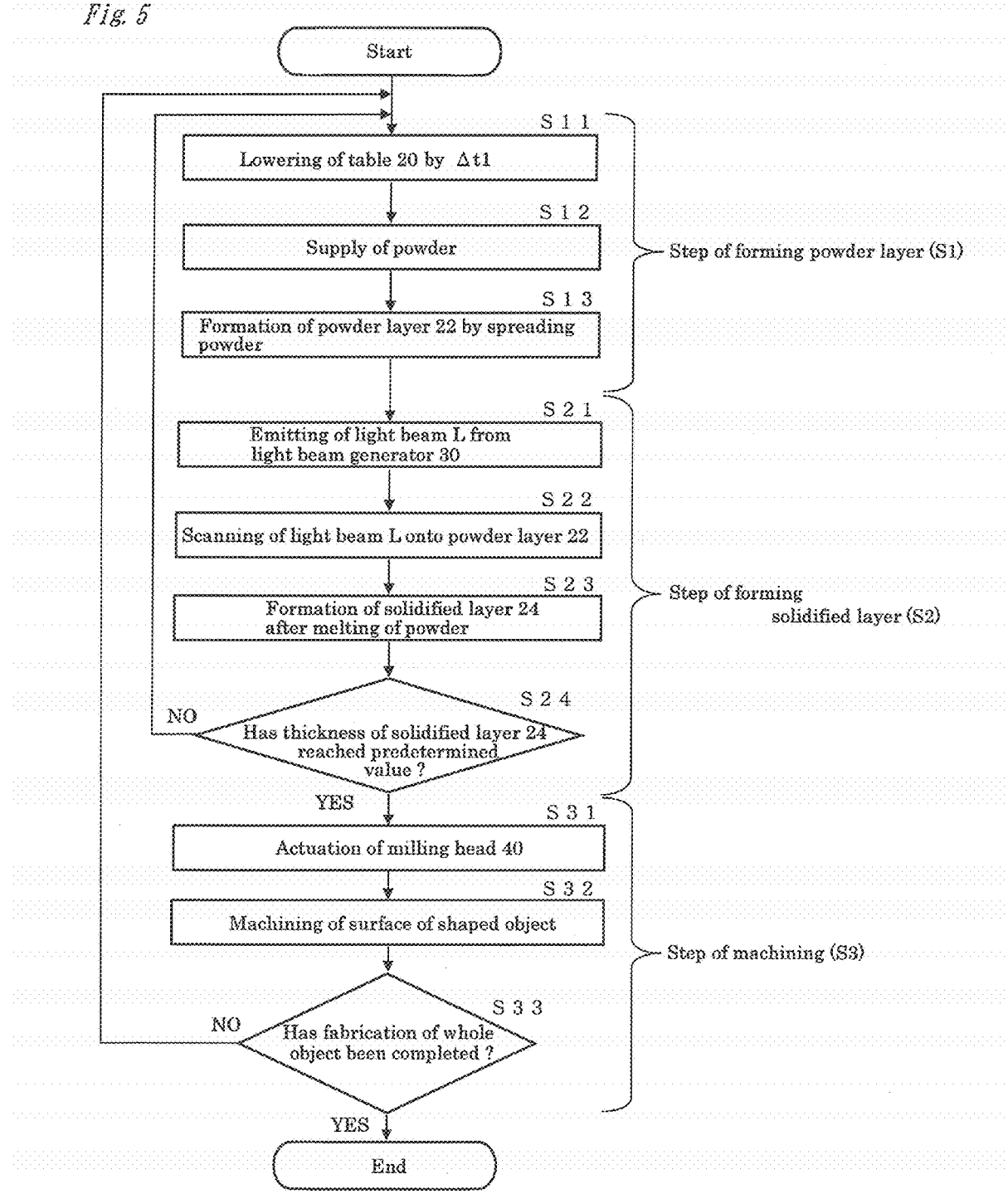
FIG. 5 is a flow chart of operations of a laser-sintering/machining hybrid machine.
Figure 6:
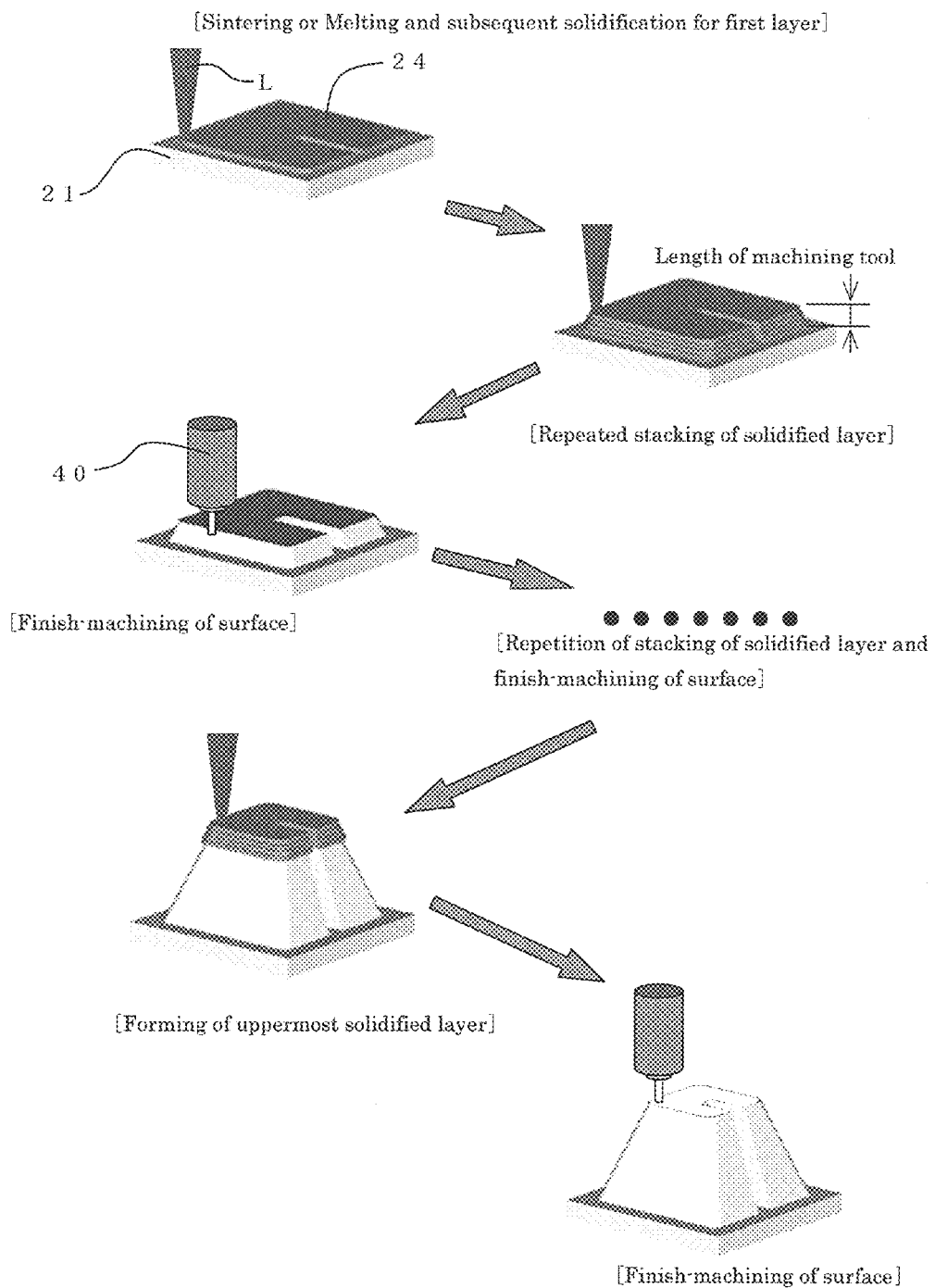
FIG. 6 is a schematic view showing a laser-sintering/machining hybrid process over time.

Operations of the laser-sintering/machining hybrid machine 1 will be described in detail with reference to FIG. 2, FIG. 5 and FIG. 6. FIG. 5 shows a general operation flow of the laser-sintering/machining hybrid machine. FIG. 6 schematically and simply shows a laser-sintering/machining hybrid process.

The operations of the laser-sintering/machining hybrid machine are mainly composed of a powder layer forming step (S1) of forming the powder layer 22; a solidified layer forming step (S2) of irradiating the powder layer 22 with the light beam L to form a solidified layer 24; and a machining step (S3) of milling a surface of the shaped object. In the powder layer forming step (S1), first, the forming table 20 is descended by $\Delta t1$ (S11). Subsequently, a powder table 25 is elevated by $\Delta t1$, and thereafter the squeegee blade 23 is driven to move in the direction of arrow A as shown in FIG. 2(a). Whereby, a powder (e.g., an iron powder having a mean particle diameter of about 5 μm to 100 μm") placed on the powder table 25 is spread to form the powder layer 22 in a predetermined thickness $\Delta t1$ (S13), while being transferred onto the base plate 21 (S12). Following this step, the solidified layer forming step (S2) is performed. In the solidified layer forming step, the light beam L (e.g., carbon dioxide gas laser (about 500 W), Nd:YAG laser (about 500 W), fiber laser (about 500 W) or ultraviolet light) is emitted from the light beam generator 30 (S21) and then the light beam L is scanned onto a desired position of the powder layer 22 by means of the galvanometer mirror 31 (S22). The scanned light beam can cause the powder to be melted and solidified, resulting in a formation of the solidified layer 24 integrated with the base plate 21 (S23). There is not limitation on a transmission of the light beam in air, and thus the light beam may also be transmitted through an optical fiber or the like.

The powder layer forming step (S1) and the solidified layer forming step (S2) are repeatedly performed until the thickness of the stacked layers 24 reaches such a predetermined value that is obtained based on a tool length of the milling head 40 (see FIG. 2(b)). Upon the sintering of the powder or the melting and subsequent solidification of the powder, the newly stacked solidified layer is integrated with the lower solidified layer which has already been formed.

When the thickness of the stacked solidified layers 24 reaches the predetermined thickness, the machining step (S3) is initiated. In the embodiments as shown in FIG. 2 and FIG. 6, the milling head 40 is actuated to initiate the execution of the machining step (S31). For example, in a case where the tool (ball end mill) of the milling head 40 has a diameter of 1 mm and an effective milling length of 3 mm, a milling in a depth of 3 mm can be performed. Therefore, in a case of $\Delta t1$ being 0.05 mm, the milling head 40 is actuated when sixty solidified layers are formed. The milling head 40 is moved in X and Y directions by means of the X-Y actuator 41 (41a, 41b) and the shaped object composed of the stacked solidified layers 24 is subjected to a surface machining (S32). When the entirety of the three-dimensional shaped object has not yet been manufactured, the step returns to the powder layer forming step (S1). Thereafter, the steps S1 through S3 are repeatedly performed to further stack the solidified layers 24, and thereby making it possible to finally manufacture the desired three-dimensional shaped object (see FIG. 6).

An irradiation path of the light beam L in the solidified layer forming step (S2) and a milling path in the machining step (S3) are determined in advance using 3-D CAD data. In this case, the machining path is determined by applying contour line processing. For example, in the solidified layer forming step (S2), the contour shape data of each of sliced sections, which are regularly-pitched (e.g., 0.05 mm pitch in the case of $\Delta t1$ being 0.05 mm) sliced sections of STL data produced from a 3-D CAD model, are used.

[Features of the Present Invention]

The present invention is featured particularly by a raw material used in the selective laser sintering method (see FIG. 7). Specifically, a powder mixture of a precipitation-hardening metal composition is adopted as the metal powder used in the selective laser sintering method. In particular, the present invention uses a Fe-based component powder and a Ni-based component powder individually included in the powder mixture such that a powder made of an alloy of Fe-based and Ni-based components is not included as a main powder in the powder mixture. It is preferred that the Ni-based component powder of the powder mixture is a powder made of an individual metal component such that the Ni-based component is not alloyed with any other component of the precipitation-hardening metal composition. The use of such powder mixture makes it possible to achieve a low-energy sintering in the selective laser sintering method, and thereby a desired three-dimensional shaped object can be provided. Moreover, the use of such powder mixture allows the three-dimensional shaped object to have a high hardness.

(Metal Powder of the Present Invention)

According to the present invention, the powder mixture of the present invention comprises a precipitation-hardening metal composition, as described above. In other words, the powder of the present invention has a composition of the precipitation-hardening metal as powder particles. In this regard, any ones of the metal components of the precipitation-hardening metal composition may be combined with each other in the powder particle. Alternatively at least one of the metal components of the precipitation-hardening metal composition may be individually contained in the powder particle. As for the Fe-based and the Ni-based components, a powder of alloy thereof (i.e., powder particle of Fe—Ni alloy) is not included in the mixture powder. In other words, the Fe-based component and the Ni-based component are separately contained as their own powder particle, meaning that a powder particle of Fe-based component and a powder particle of Ni-based particle are respectively included in the mixture powder.

The present invention is intended to use a non-alloyed metal with respect to the Fe-based component and the Ni-based component included as a main powder component. Thus, a slight amount of the powder particle of Fe—Ni alloy may be contained if it serves as an accessory component. In this regard, the amount of the powder particle of Fe—Ni alloy serving as the accessory component is about 1 weight percent or lower based on the total weight of metal powder. In other words, if the content of the powder particle of Fe—Ni alloy is about 1 weight percent or lower based on the total weight of metal powder, it means that a powder of alloy of the Fe-based and Ni-based components is not included as a main powder in the mixture powder.

The term "Fe-based component" used herein substantially means an iron component, but the meaning thereof includes an embodiment wherein the iron component contains an impurity which can be inevitably entrained. Similarly, the term "Ni-based component" used herein substantially means a nickel component, but the meaning thereof includes an embodiment wherein the nickel component contains an impurity which can be inevitably entrained. As for the Fe-based component, it may be alloyed with other component, provided that the Fe-based component is not alloyed with the Ni-based component.

It is preferred in the present invention that not only the Fe-based component and the Ni-based component are not alloyed with each other, but also the Ni-based component powder is a powder of an individual Ni-based component. In other words, it is more preferred that the Ni-based component which constitutes the precipitation-hardening metal composition is not alloyed with any other component of the precipitation-hardening metal composition, and also is not alloyed with the impurity components. This can facilitate a low-energy sintering even more. Namely, the low-energy sintering can be more easily achieved by the powder of the individual Ni-based component, making it possible to form a low-density porous portion in the solidified layer. The low-density porous portion can be suitably used as a gas venting portion when the three-dimensional shaped object is used as a metal mold. The low-energy sintering in itself allows a thermal loading and a thermal stress to be lowered, resulting in a prevention of a warping or deformation phenomenon attributed to the heat, which maintains a requirement of the dimensional accuracy of the shaped object.

In the present invention, the precipitation-hardening metal composition is a maraging steel composition or a precipitation-hardening stainless steel composition, for example. Namely, the metal powder of the present invention is configured to be the powder mixture of the maraging steel composition or precipitation-hardening stainless steel composition. Examples of the maraging steel composition include not only 18 Ni-based maraging steel and 20 Ni-based maraging steel as described below, but also 25 Ni-based maraging steel. Similarly, examples of the precipitation-hardening stainless steel composition include not only SUS 630 as described below, but also SUS 631.

18 Ni-Based Maraging Steel
Main Component
 Ni: 17 to 19 percent by weight
 Co: 7 to 8.5 percent by weight
 Mo: 4.6 to 5.1 percent by weight
 Ti: 0.3 to 0.5 percent by weight
 Al: 0.05 to 0.15 percent by weight
 Fe: Remaining percent by weight
Accessory Component or Inevitable Component
 C: Less than 0.03 percent by weight
 Si: Less than 0.1 percent by weight
 Mn: Less than 0.1 percent by weight
 P: Less than 0.02 percent by weight
 S: Less than 0.02 percent by weight
(The term percent by weigh is based on the total weight of the powder mixture)

20 Ni-Based Maraging Steel
Main Component
 Ni: 18.0 to 20.0 percent by weight
 Ti: 1.30 to 1.60 percent by weight
 Nb: 0.30 to 0.60 percent by weight
 Al: 0.15 to 0.35 percent by weight
 Fe: Remaining percent by weight
Accessory Component or Inevitable Component
 C: Less than 0.03 percent by weight
 Si: Less than 0.10 percent by weight
 Mn: Less than 0.10 percent by weight
 P: Less than 0.02 percent by weight
 S: Less than 0.02 percent by weight
(The term percent by weigh is based on the total weight of the powder mixture)

Precipitation-Hardening Stainless Steel (SUS630)
Main Component
 Cr: 15.5 to 17.5 percent by weight
 Ni: 3.00 to 5.00 percent by weight
 Cu: 3.00 to 5.00 percent by weight
 Nb: 0.15 to 0.45 percent by weight
 Fe: Remaining percent by weight
Accessory component or inevitable component
 C: Less than 0.07 percent by weight
 Si: Less than 1.00 percent by weight
 Mn: Less than 1.00 percent by weight
 P: Less than 0.04 percent by weight
 S: Less than 0.03 percent by weight
(The term percent by weigh is based on the total weight of the powder mixture)

It is preferred in the present invention that an average diameter of powder particles of the powder mixture is in the range of 5 μm to 50 μm. The reason for this is that the powder particles tend to aggregate when the average diameter is less than 5 μm, while on the other hand the powder layer formed upon the selective laser sintering method generally has a thickness of about 50 μm. The detail explanation is as follows: a particle diameter of the metal powder is required to be as small as less than the thickness of the powder layer. Such smaller particle diameter can provide a higher packing density of the powder as well as an improved absorption efficiency of the light beam (laser) upon producing the shaped object. This will lead to a higher sintered density and a smaller surface-roughness of the shaped object. On the other hand, when the particle diameter is too small, the metal powder tends to form the aggregated particles so that a packing density of the powder becomes rather lower, thus making it impossible to uniformly form a thin metal layer thereof. For this reason, the average diameter of powder particles (e.g., average diameter of powder particle of Ni component or other components) is preferably in the range of 5 μm to 50 μm, and more preferably in the range of 10 μm to 30 μm. As used in this description, the phrase particle diameter substantially means a maximum length among lengths in all directions of each particle, in which case the phrase mean particle diameter substantially means a particle size calculated as a number average by measuring each diameter of a certain number of particles (e.g., ten particles), based on an electron micrograph or optical micrograph of the particles.

As for the metal powder of the present invention, the shape of the powder particle (particle shape of each component) in the powder mixture is not particularly limited. For example, the particle shape of the powder may be sphere, oval or polyhedron (e.g. cube), but the present invention is not limited to those. It is, however, preferred that the powder particle has a spherical shape in terms of increasing a higher packing density of the powder, and thereby uniformly forming a thin powder layer. As used in this description, the phrase spherical shape substantially an shape whose aspect ratio (ratio of the largest dimension to the smallest dimension when the powder particle is measured in various directions) is in the range of 1.0 to 2.0. The spherical powder particles of the powder mixture with their average diameter of about 5 μm to about 50 μm make it possible to thinly form the powder layer (e.g., layer thickness of about 10 μm to about 50 μm) in the selective laser sintering method, and thereby not only a high accuracy manufacturing of the shaped object can be achieved, but also an extra solidified portion to be removed by the machining can be reduced.

As for a preparation of the powder mixture of the present invention, constituent powders may be mixed with each other by a suitable blender. Each of the constituent powders may be one obtained by an atomization process. Namely, the constituent powder in itself may be an atomized powder (i.e., sprayed powder particle).

(Manufacturing Method of the Present Invention)

The selective laser sintering method can be suitably performed by use of the metal powder of the present invention. Specifically, the three-dimensional shaped object can be obtained without the light beam irradiation having a particularly high energy. For example, the shaped object can be produced by the light beam irradiation under such a condition that an irradiation energy density E of the light beam is in the range of 0.5 J/mm² to 7.0 J/mm². It should be noted that the light beam irradiation for the conventional maraging steel composition of the prior art is required to have a high energy, i.e., at least energy density E of 10.0 J/mm² or higher on a like-for-like basis.

The low-energy sintering in the method of the present invention makes it possible to form a low-density porous portion as a portion of the solidified layer. The low-density porous portion can be suitably used as a gas venting portion or the like in a case where the three-dimensional shaped object is used as a metal mold. For example, a higher-density sintered layer (sintered density: about 90% to about 98%) can be formed by a light beam having the irradiation energy density E of about 5.0 J/mm² to about 7.0 J/mm², whereas a lower-density sintered layer (sintered density: about 70% to about 90%) can be formed by a light beam having the irradiation energy density E of about 0.5 J/mm² to about 3.0 J/mm² wherein their conditions (e.g., manufacturing conditions) are similar to those described above. The irradiation energy density E can be adjusted by controlling an output energy of the light beam, a scanning rate of the light beam, a condensing diameter of the light beam or the like. Specifically, the irradiation energy density E can be lowered by (a) decreasing of the output energy of the light beam, (b) increasing the scanning rate of the light beam, (c) enlarging a scanning pitch of the light beam or (d) increasing the condensing diameter of the light beam, for example. While on the other hand, the irradiation energy density E can be increased by (a) increasing of the output energy of the light beam, (b) lowering the scanning rate of the light beam, (c) narrowing the scanning pitch of the light beam, and (d) decreasing the condensing diameter of the light beam. As for the upper limit of the irradiation energy density E, it is not particularly limited in the present invention, and thus the three-dimensional shaped object may be produced in some cases by the light beam having the irradiation energy density E of 7.0 J/mm² or higher. In this regard, the irradiation energy density E of the light beam may be in the range of about 7.0 J/mm² to about 20.0 J/mm², for example.

As used in this description, the term sintered density % substantially means a sintered sectional density (occupation ratio of a metallic material) determined by image processing of a sectional photograph of the shaped object. Image processing software for determining the sintered sectional density is Scion Image ver. 4.0.2 (freeware). In such case, it is possible to determine a sintered sectional density $\rho_s$ from the below-mentioned Equation 1 by binarizing a sectional image into a sintered portion (white) and a vacancy portion (black), and then counting all picture element numbers $Px_{all}$ of the image and also picture element number $Px_{white}$ of the sintered portion (white).

$$\rho_S = \frac{Px_{white}}{Px_{all}} \times 100 (\%) \qquad \text{[Equation 1]}$$

The three-dimensional shaped object obtained by the selective laser sintering method may be subjected to a heat treatment. For example, the heating temperature of the shaped object may be preferably in the range of 400° C. to 550° C., more preferably in the range of 450° C. to 500° C. Such heating allows the shaped object to have a further higher hardness, i.e., a Vickers hardness Hv of 400 to 600. In this regard, the hardness of the conventional shaped object cannot be increased by a heating thereof, the conventional shaped object being produced by use of a powder material of the prior art (i.e., prior art powder mixture composed of chromium-molybdenum steel powder, a nickel powder and/or a nickel based alloy powder, a copper powder and/or a copper based alloy powder and a graphite powder. Contrary to that, the present invention makes it possible to increase the hardness of the shaped object due to a precipitation hardening (aging hardening) attributed to the use of the powder material of the maraging steel composition. It is assumed that the maraging composition-based shaped object obtained by a laser-sintering and layer-stacking process through a laser beam irradiation is in a substantially pretreated state by a solution treatment since a melting and subsequent rapid cooling caused upon the sintering are suitably performed. Therefore, a desired hardness and mechanical strength of the shaped object can be provided just by subjecting the shaped object to a low-temperature heat treatment (e.g., 400° C. to 550° C. heat treatment) as a precipitation-hardening treatment. This is especially true for the shaped object produced by use of the powder mixture of 18 Ni-based maraging steel composition. The low temperature of such treatment can lead to a lower change in dimension of the shaped object, making it possible to maintain a high machining accuracy provided by the laser-sintering/machining hybrid operation. The heating period of time for the precipitation-hardening treatment is, but not limited to, preferably in the range of about 0.5 hour to about 10 hours, more preferably in the range of about 1 hour to about 5 hours. The heating means for such precipitation-hardening treatment may be a heating chamber such as a heating furnace and the like. In the case of the heating chamber, by putting the three-dimensional shaped object obtained by the selective laser sintering method into the heating chamber, the whole of the shaped object can be heated. Since the machining accuracy of the shaped object is kept after the heating treatment, the machining process (e.g., cutting process) can be performed prior to such heating treatment. As a matter of course, the machining process may be performed after the heating treatment.

Upon the heating treatment, a nitriding treatment may be additionally performed as a surface effect treatment. Namely, the surface of the three-dimensional shaped object may be subjected to the nitriding treatment when the three-dimensional shaped object is subjected to the heat treatment under a temperature condition of 400 ° C. to 550 ° C. This nitriding treatment can cause the hardness of the surface portion of the shaped object to be increased. For example, the surface portion of the shaped object can become to have the Vickers hardness Hv of about 900 to about 1000 by the nitriding treatment.

Similarly to the above heating treatment, the heating period of time for the nitriding treatment is, but not limited to, preferably in the range of about 0.5 hour to about 10 hours, more preferably in the range of about 1 hour to about 5 hours.

In the manufacturing method of the present invention, the formations of the powder layer and the solidified layer may be performed on a base plate. It is preferable in this case to perform a pretreatment for reducing a "dimension change attributed to the above heat treatment". For example, prior to the formations of the powder layer and the solidified layer on the base plate, such base plate is preferably heated at a higher temperature than the temperature of the above heat treatment. This higher temperature than that of the above heat treatment is a temperature higher than 400° C. to 550° C., and for example it may be about 600° C. More specifically, such heating of the base plate may be performed at higher temperature than that of the heating treatment of the shaped object by 20° C. to 100° C. This heating of the base plate, which is performed prior to the heating of the shaped object, makes it possible to reduce a dimensional change of the base plate during the heating treatment of the shaped object (i.e., during the heating of the shaped object performed at a temperature of 400° C. to 550° C.), which leads to an improvement in the dimensional accuracy of the shaped object integrated with the base plate.

(Three-dimensional Shaped Object of the Present Invention)

The three-dimensional shaped object of the present invention is obtained by performing the selective laser sintering method using the above metal powder. Thus, the three-dimensional shaped object of the present invention is made from the precipitation-hardening metal composition. In other words, the three-dimensional shaped object is made of the material of the maraging steel composition or the precipitation-hardening stainless steel composition.

Due to the factor that the shaped object is produced from the powder mixture of the precipitation-hardening metal composition wherein the Fe-based and the Ni-based components are individually included in their own powder particles and/or wherein the Ni-based component powder is a powder made of an individual component such that the Ni-based component is not alloyed with any other component, the three-dimensional shaped object of the present invention exhibits a high hardness and a high mechanical strength. In this regard, the three-dimensional shaped object has a Vickers hardness Hv of 270 to 350. When the shaped object is subjected to a heating treatment under a temperature condition of 400° C. to 550° C. as a precipitation-hardening treatment, the shaped object becomes to have a higher hardness, and thus have a Vickers hardness Hv of 400 to 500, for example. Since such precipitation-hardening treatment is a low-temperature heating treatment, the shaped object merely undergoes a lower change in dimension thereof, and thus it can maintain a high machining accuracy provided by the laser-sintering/machining hybrid operation.

As used in this description, the term Vickers hardness Hv means a value of hardness measured according to JIS Z2244. Namely, the value of Vickers hardness Hv is one obtained through pushing the shaped object with a load of 100 to 1000 gf for 10 seconds, followed by measuring a diagonal dimension of the resulting dent formed due to the pushing.

The three-dimensional shaped object of the present invention can not only exhibit a high hardness and a high mechanical strength, but also make for a satisfactory machinability. Specifically, even when the three-dimensional shaped object of the present invention is subjected to a machining process (especially "dry machining process" under such a condition where the non-sintered metal powder is still present on the outer periphery thereof) by a machining tool with φ2.0 mm or φ0.8 mm, such machining tool does not undergo a chipping.

The three-dimensional shaped object can be used as a metal mold as well as an insert part or nest part of the metal mold. Since the three-dimensional shaped object of the present invention exhibits a higher hardness, a higher mechanical strength and a higher accuracy than those of the prior art shaped object obtained by use of the conventional metal powder, it can be suitably used as a metal mold for a hard plastic material molding in a mass production.

Although a few embodiments of the present invention have been hereinbefore described, they are merely typical embodiments and thus the present invention is not limited to those. It will be readily appreciated by those skilled in the art that various modifications are possible without departing from the scope of the present invention.

It should be noted that the present invention as described above includes the following aspects:

The first aspect: A metal powder for use in a selective laser sintering method for producing a three-dimensional shaped object, wherein the metal powder comprises a powder mixture of a precipitation-hardening type metal composition; and a Fe-based component powder and a Ni-based component powder are individually included in the powder mixture whereas a powder made of an alloy of Fe-based and Ni-based components is not included as a main component in the powder mixture.

The second aspect: The metal powder according to the first aspect, wherein the Ni-based component powder is a powder made of an individual metal component such that the Ni-based component is not alloyed with any other component.

The third aspect: The metal powder according to the first or second aspect, wherein the precipitation-hardening type metal composition is a maraging steel composition or a precipitation-hardening type stainless steel composition.

The fourth aspect: The metal powder according to the third aspect, wherein the maraging steel composition comprises 17 to 19 weight percent of Ni component, 7 to 8.5 weight percent of Co component, 4.6 to 5.1 weight percent of Mo component, 0.3 to 0.5 weight percent of Ti component, 0.05 to 0.15 weight percent of Al component and a remaining weight percent of Fe component.

The fifth aspect: The metal powder according to anyone of the first to fourth aspects, wherein powder particles of the powder mixture have an average diameter of 5 μm to 50 μm.

The sixth aspect: The metal powder according to any one of the first to fifth aspects, wherein powder particles of the powder mixture have an aspect ratio of 1.0 to 2.0.

The seventh aspect: A method for manufacturing a three-dimensional shaped object performed as a selective laser sintering method, the method comprising the steps of:

(i) forming a solidified layer by irradiating a predetermined portion of a powder layer with a light beam, thereby allowing sintering of the powder of the predetermined portion or melting and subsequent solidification thereof; and (ii) forming another solidified layer by newly forming a powder layer on the resulting solidified layer, and then irradiating another predetermined portion of the new powder layer with the light beam, the steps (i) and (ii) being repeatedly performed;

wherein the powder layer is formed by use of the metal powder according to any one of the first to sixth aspects.

The eighth aspect: The method according to the seventh aspect, wherein the irradiation of the light beam is performed under such a condition that an irradiation energy density E of the light beam is in the range of 0.5 J/mm² to 7.0 J/mm².

The ninth aspect: The method according to the seventh or eighth aspect, wherein the three-dimensional shaped object is subjected to a heat treatment at a temperature of 400° C. to 550° C.

The tenth aspect: The method according to anyone of the seventh to ninth aspects, wherein a surface of the three-dimensional shaped object is subjected to a nitriding treatment.

The eleventh aspect: The method according to the ninth aspect, wherein the formations of the powder layer and the solidified layer are performed on a base plate; and
prior to the formations of the powder and solidified layers, a heating of the base plate is performed at a higher temperature than the temperature for the heat treatment of the shaped object.

The twelfth aspect: A three-dimensional shaped object manufactured by the method according to anyone of the seventh to eleventh aspects.

The thirteenth aspect: The three-dimensional shaped object according to the twelfth aspect, wherein the shaped object has a Vickers hardness Hv of 270 to 350.

The fourteenth aspect: A three-dimensional shaped object manufactured by the method according to the twelfth or thirteenth aspect when appendant to the ninth aspect, wherein the shaped object has a Vickers hardness Hv of 400 to 600 at a point in time after the heat treatment of the shaped object.

The fifteenth aspect: The three-dimensional shaped object according to any one of the twelfth to fourteenth aspects, wherein the shaped object is a metal mold used for a resin molding or a part of such metal mold.

EXAMPLES

Example 1

The experimental studies were carried out with respect to the characterizing features of the present invention. Specifically, the laser-sintering/layer-stacking process as well as the machining process was performed by use of the following powder mixtures A, B and C.
(Powder Mixture A) 18 Ni-Based Maraging
Fe—about 18% Ni—about 8% Co—about 5% Mo—about 0.4% Ti—about 0.1% Al (wherein "%" refers to percent by weight, and the content of Fe is remaining percent by weight)
(Powder Mixture B) 20 Ni-Based Maraging
Fe—about 19% Ni—about 1.5% Ti—about 0.5% Nb—about 0.3% Al (wherein "%" refers to percent by weight, and the content of Fe is remaining percent by weight)
(Powder Mixture C) Precipitation-Hardening Stainless Steel (SUS630)
Fe—about 15% Cr—about 4% Ni—about 5% Cu—about 0.4% Nb (wherein "%" refers to percent by weight, and the content of Fe is remaining percent by weight)

By using the powder mixtures A, B and C with their average particle diameter of 30 μm (i.e., 0.03 mm), the powder layers with their thickness of 0.05 mm were formed respectively. The irradiating laser for forming the powder layers was a carbon dioxide gas laser (output powder: 200 W with an outputting condition of 90%). The shaped object was produced by irradiating the powder layer with the laser beam to form the stacked sintered layers under such a condition that a scanning rate of the light beam is 150 mm/sec and a scanning pitch of the light beam is 0.20 mm. A sectional structure, a hardness and a machinability were evaluated with respect to the stacked-layers shaped object as thus formed.

The appearances of the sectional structures of the stacked-layers shaped objects are shown in FIGS. 8(a) to 8(c). The following Table 1 shows that not only the hardness of the shaped object, but also the hardness of the shaped object after subjecting it to an additional heat treatment (specifically, the heat treatment under a condition of 900° C./2 hours-solution treatment and 470° C./3 hours-precipitation-hardening treatment). The Hv values listed in the column "After heat treatment" (right column) in Table 1 mean the following:

With respect to "20 Ni-based maraging" and "Precipitation-hardening stainless (SUS630)", the values "Hv 469" and "Hv 458" are respectively Hv values measured after not only the precipitation-hardening treatment but also the solution treatment.

With respect to "18 Ni-based maraging", the value "Hv 489" is Hv value measured only after the precipitation-hardening treatment without the solution treatment.

Thus, the result of Table 1 shows the following matters:
The hardness of the shaped object of each of "20 Ni-based maraging" and "Precipitation-hardening stainless (SUS630)" was not increased only by the precipitation-hardening treatment, and instead was increased by additionally carrying out the solution treatment in addition to the precipitation-hardening treatment.
While on the other hand, the hardness of the shaped object of "18 Ni-based maraging" was increased only by the precipitation-hardening treatment without the solution treatment.

Therefore, it has been found that the hardness of the shaped object in the case of "18 Ni-based maraging" is expected to be increased just by subjecting the shaped object to a low-temperature precipitation-hardening treatment (i.e., 400° C. to 550° C. heat treatment) while not subjecting it to a high-temperature solution treatment (i.e., 800° C. to 1000° C. heat treatment).

TABLE 1

| | After manufacturing of shaped object | After heat treatment |
|---|---|---|
| 1. 18 Ni-based maraging | HV 312 | HV 484 |
| 2. 20 Ni-based maraging | HV 312 | HV 469 |
| 3. Precipitation-hardening stainless (SUS630) | HV 302 | HV 458 |

(Machinability)

The result of a machinability test was shown in Table 2. In this test, the machinability of the shaped object was particularly evaluated by performing a dry machining process wherein a surface of the shaped object was subjected to the dry machining after a completion of the solidified layer formation under such a condition that the remaining metal powder had been still present. The symbol "○" in Table 2 represents that there was no problem with the machinability (i.e., there was no "chipping" in a cutting edge of a machining tool), whereas the symbol "X" in Table 2 represents that there was "chipping" in the cutting edge of the machining tool.

TABLE 2

| | Φ 2.0 mm tool | Φ 0.8 mm tool |
|---|---|---|
| 1. 18 Ni-based maraging | ○ | ○ |
| 2. 20 Ni-based maraging | ○ | X |
| 3. Precipitation-hardening stainless (SUS630) | ○ | X |

Example 2

The powder mixture of 18 Ni-based maraging composition (Fe—18% Ni—8% Co—5% Mo—0.4% Ti—0.1% Al) was prepared by use of six kinds of powder materials shown in FIGS. 9(a) to 9(f). Thereafter, the laser-sintering/layer-stacking process was performed by use of the prepared powder mixture.

A hardness and a mechanical strength of the obtained shaped object were evaluated, comparing them with those of another case where the powder material of the prior art was used. The result is shown in Table 3. As seen from Table 3, the shaped object according to the present invention exhibited the higher hardness and the higher mechanical strength, compared with those of the case of the prior art.

TABLE 3

|  |  | Hardness HV | Tensile strength (MPa) | 0.2% Proof stress (MPa) |
|---|---|---|---|---|
| Material of prior art | After manufacturing of shaped object | 260 | 738 | 518 |
|  | After heat treatment | 260 | 744 | 474 |
| Maraging | After manufacturing of shaped object | 310 | 1,002 | 705 |
|  | After heat treatment | 480 | 1,461 | 1,211 |

INDUSTRIAL APPLICABILITY

The three-dimensional shaped object according to the present invention can be suitably used as a metal mold for a plastic injection molding, a press molding, a die casting, a casting or a forging.

CROSS REFERENCE TO RELATED PATENT APPLICATION

The present application claims the right of priority of Japanese Patent Application No. 2010-119297 (filed on May 25, 2010, the title of the invention: METAL POWDER FOR SELECTIVE LASER SINTERING, METHOD FOR MANUFACTURING THREE-DIMENSIONAL SHAPED OBJECT BY USING THE SAME, AND THREE-DIMENSIONAL SHAPED OBJECT OBTAINED THEREFROM), the disclosure of which is incorporated herein by reference.

The invention claimed is:

1. A metal powder for use in a selective laser sintering method for producing a three-dimensional shaped object, wherein
the metal powder comprises a powder mixture of a precipitation-hardening metal composition, wherein the precipitation-hardening metal composition is a maraging steel composition or a precipitation-hardening stainless steel composition;
a Fe-based component powder and a Ni-based component powder are individually included in the powder mixture whereas a powder made of an alloy of Fe-based and Ni-based components is not included as a main powder in the powder mixture, wherein the Ni-based component powder is a powder made of an individual component such that the Ni-based component is not alloyed with any other component; and
the maraging steel composition comprises 17 to 19 weight percent of Ni component, 7 to 8.5 weight percent of Co component, 4.6 to 5.1 weight percent of Mo component, 0.3 to 0.5 weight percent of Ti component, 0.05 to 0.15 weight percent of Al component and a remaining weight percent of Fe component.

2. The metal powder according to claim 1, wherein a powder particles of the powder mixture have an average diameter of 5 μm to 50 μm.

3. The metal powder according to claim 1, wherein powder particles of the powder mixture have an aspect ratio of 1.0 to 2.0.

* * * * *